July 8, 1969 R. J. RADUS 3,453,876
MAGNETOSTRICTIVE LOAD CELLS
Filed Oct. 19, 1966 Sheet 1 of 3

WITNESSES
Theodore F. Wrobel
James F. Young

INVENTOR
Raymond J. Radus
BY
ATTORNEY

United States Patent Office 3,453,876
Patented July 8, 1969

---

3,453,876
MAGNETOSTRICTIVE LOAD CELLS
Raymond J. Radus, Monroeville, Pa., assignor to Westinghouse Electric Corporation, Pittsburgh, Pa., a corporation of Pennsylvania
Filed Oct. 19, 1966, Ser. No. 587,714
Int. Cl. G01l 5/18
U.S. Cl. 73—141                                     1 Claim

ABSTRACT OF THE DISCLOSURE

A magnetostrictive load cell is disclosed utilizing a beam member supported as a simple beam and comprising a magnetic material. The permeability of the magnetic material is altered by the application of a load force to the beam member which causes the beam to go into compression and tension about a longitudinal neutral axis. Excitation and sensing coils are disposed in the beam member to excite and sense changes in the flux linkages therein due to the load force.

---

The present invention relates to load force sensing devices and, more particularly, to magnetostrictive load cells.

It is well known that the magnetic properties of a soft magnetic material may be altered by stressing the material by the application of forces thereto. One of the magnetic characteristics which changes with stress is the permeability of magnetic material. Changes in the permeability is of particular interest since such changes may be detected and utilized to give an indication of the magnitude of load force applied to the magnetic material. A magnetostrictive load sensing device has been devised utilizing a block of magnetic material which has a compressive load force applied thereto which changes the permeability thereof. In the unloaded condition, a symmetrical magnetic field is established in the block of magnetic material, and when the device is loaded the field is distorted which is sensed by windings suitably disposed within the block. In such a device, an excitation winding is provided to supply magnetic flux within the block, while a sensing winding senses changes in the magnetic flux due to loading of the block. The application of load force distorts the block into compression which causes changes in the permeability of the magnetic material that is sensed by by the sensing device and gives an indication of the magnitude of this load as an output. For proper operation of the device, the sensing and excitation windings are disposed at 90° with respect to each other and are placed at a 45° physical displacement from the direction of the applied compressive load force. This permits a zero or null output to be provided from the sensing winding in the unloaded case and provides maximum magnetic coupling between the windings when the device is loaded.

The above described device has a number of disadvantages. One of them is that the sensing and excitation windings must be placed at 45° physical displacements from the application of the load force and must be placed at 90° with respect to each other with desired operation. Another limiting factor is that the use of a block type of structure with the device is being placed in compression by the load force. This causes relatively small changes in the permeability thereof except when relatively high load forces are applied to the block. Thus, there is a limited stress amplification in the device, especially at small loads, and a relatively low output from the sensing windings thereof.

It is therefore an object of the present invention to provide a new and improved magnetostrictive load cell.
It is a further object of the present invention to provide a new and improved magnetostrictive load cell which permits the advantageous placement of excitation and sensing windings.

It is a further object to provide a new and improved magnetostrictive load cell which is highly responsive to load forces applied thereto to provide a large amplitude output proportional to the magnitude of the load force.

Broadly, the above cited objects are accomplished by providing a magnetostrictive load cell including a beam member comprising a magnetic material, with the permeability of the magnetic material being altered in response to a load force applied thereto. The load force causes tensile and compressive forces to be exerted on the beam member about the longitudinal neutral axis thereof. An excitation winding is supplied to provide magnetic flux in the beam member with a sensing winding being suitably disposed in relation thereto so as to sense changes in the flux linkages therethrough and supply an output in response to the magnitude of the load force applied to the beam member.

These and other objects and advantages of the present invention will become more apparent when considered in view of the following specification and drawing in which.

Figure 1:
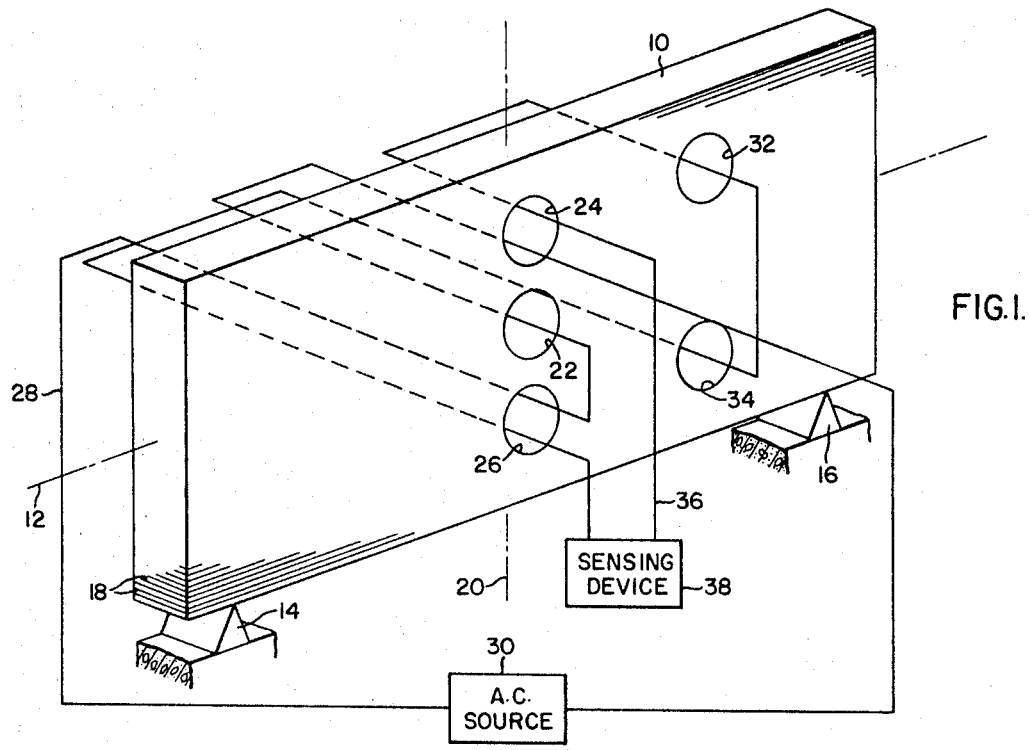
FIGURE 1 is a pictorial diagram of the magnetostrictive load cell of the present invention.

Referring now to FIG. 1, the magnetostrictive load cell of the present invention is shown pictorially and includes a beam member 10 which is shown in the form of a rectangular parallelepiped having a longitudinal dimension along a longitudinal neutral axis 12 greater than the height and width thereof. The beam member is supported as a simple beam by a pair of contact supports 14 and 16 which are disposed at the bottom of the beam member 10 near the outside edges thereof. The beam member 10 is fabricated from a soft magnetic material and may be formed of laminated strips such as indicated by the strips 18 in the bottom left-hand corner of the beam member 10 in order to reduce eddy current losses in the device. The soft magnetic material may comprise non-oriented or singly oriented soft magnetic material; however, the sensitivity of the cell is greatly increased through the use of doubly oriented magnetic material, such as cube texture silicon iron, marketed by the Westinghouse Electric Corporation under the trade name Cubex. Magnetic material of this latter type is easily magnetized in each of its three dimensions, and moreover, shows a relatively high change in permeability for a given stress applies thereto. The device shown in FIG. 1 is not drawn to scale for ease of illustration. However, a beam member for use in a load cell device having the following dimension provides suitable results: lamina strips having a length of 12 inches, a width of 1 3/16 inches and a thickness of .0112 inch to .0115 inch thick, with 17 lamina strips being urged to provide a 7/32 inch thick beam member.

Winding receiving apertures 22, 24 and 26 are placed in the beam member 10 along the central vertical axis 20 thereof. The apertures extend through the width of the beam member 10 with the aperture 22 being centrally disposed at the intersection of the longitudinal axis 12 and the vertical axis 20. The apertures 24 and 26 are disposed respectively above and below the longitudinal axis 12 symmetrically with respect to the center aperture 22.

Within the apertures 22, 24 and 26 are disposed an excitation winding 28. The excitation winding 28 is supplied by an A.C. source 30, which is connected thereacross, and which may supply a suitable A.C. voltage at a 60 cycle frequency for example. The excitation winding 28 is so wound that from the right end of the A.C. source 30, it enters from the front of the aperture 24 and is returned out of the front of the aperture 22 and then into the front of the aperture 26 and then return to the left side of the A.C. source 30.

A pair of apertures 32 and 34 are also provided, with the aperture 32 being disposed above the longitudinal axis 12 at the same distance above the longitudinal axis as the aperture 24 and with the aperture 34 being disposed below the axis 12 the same distance as the aperture 26. The apertures 32 and 34 are disposed along the same vertical axis at a predetermined distance from the vertical axis 20.

A sensing winding 36 is provided and disposed within the apertures 24, 26, 32 and 34, as indicated, with a sensing device 38 being connected at the ends of the winding 36. The winding 36 is disposed from one end of the sensing device 38 and enters the front of the aperture 24, comes out of the front of the aperture 32, goes into the front of the aperture 34, and out of the front of the aperture 26, to the other end of the sensing device 38. The sensing device 38 is responsive to current induced in the winding 36 and may, for example, comprise a meter, such as, an ammeter or volt meter, or may also comprise an ocilloscope for the visional display of the waveform of signal appearing in the winding 36.

Figure 2A:
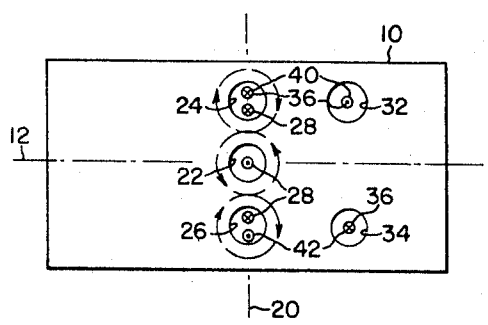
FIGS. 2A and 2B are schematic diagrams of the load cell of the present invention and are used in explaining the operation thereof.
Figure 2B:
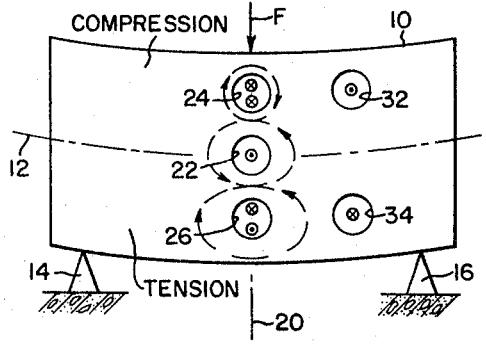

Reference is now made to the schematic diagram of the load cell as shown in FIGS. 2A and 2B. FIG. 2A shows the cell in an unloaded condition similar to that shown in FIG. 1 with the permeability of the magnetic material of the beam member 10 substantially the same above and below the longitudinal neutral axis 12. A dot (.) and an X convention is utilized on FIGS. 2A and 2B, to indicate the direction of current flow at a given instant of time in the excitation winding 28 and the sensing winding 36. A dot indicates that current is flowing out of the paper and an X indicates that current is flowing into the paper at that instant of time. Thus, the current in the excitation winding 28 in the conductor appearing in the center aperture 22 will be flowing out of the paper while the current in the apertures 24 and 26 will be flowing into the paper as shown in FIG. 2A. The sensing winding is connected to have a pair of coils 40 and 42, the coil 40 being disposed in the top half of the beam member 10 with current at a given instant of time flowing into the paper in the conductor appearing in the aperture 24 and out of the paper in the conductor appearing in the aperture 32. The other coil 42, at a given instant of time, will have current flowing into the paper in the conductor at the aperture 34 and current flowing out of the paper in the conductor appearing in the aperture 26. As can be seen from FIGS. 2A and FIG. 1, the coils 40 and 42 of the sensing winding 36 are connected in a series bucking arrangement so that any current induced therein will be in opposite directions and tend to cancel each other unless some unbalance in the magnitudes of these currents occurs.

The magnetic field induced by the excitation current applied to the excitation winding 28 is shown by the flux lines indicated by the arrows in FIG. 2A. It can be seen that the flux lines take a clockwise substantially circular configuration, in the unloaded case, about the outer apertures 24 and 26 and have a counterclockwise direction around the center aperture 22. The flux lines about the top aperture 24 link the coil 40 of the sensing winding 36, while the flux lines about the bottom aperture 26 link the coil 42 of the sensing winding 36. The direction if the flux lines as shown in FIG. 2A, of course, reverses each half cycle due to the alternating current waveform supplied by the A.C. source 30. Thus, current will be induced in the sensing winding 36 in response to the change of flux with time. This current is induced in the coils 40 and 42 and in the unloaded condition as shown in FIG. 2A, with the beam member 10 having a substantially constant permeability, equal and opposite currents will be induced in the coils 40 and 42, respectively, which will cancel each other to provide a zero or null output across the sensing device 28, which is indicative of an unloaded condition.

Figure 3:
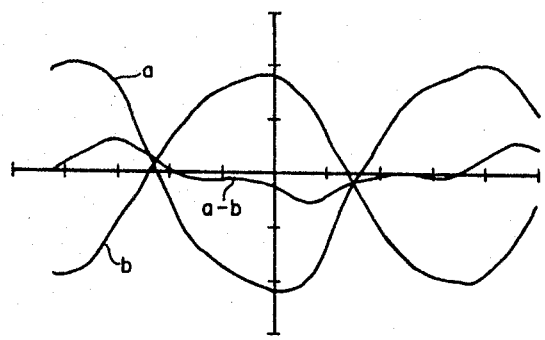
FIGS. 3, 4 and 5 are waveform diagrams showing the output of the sensing windings as utilized in the load cell described herein.

FIG. 3 shows a plot of voltage or a function of time of voltages induced in the coils 40, 42 and the resultant output at the sensing device 38. The curve $a$ shows the voltage induced in the winding 42, curve $b$ shows the voltage induced in the coil 40. Curve $a$–$b$ shows the resultant voltage which appears across the sensing device 38, which is the difference between the magnitudes of the curves $a$ and $b$, and, as can be seen by FIG. 3, is substantially a zero voltage output for the unloaded state of the beam member 10. It can thus be seen that the voltages induced in the coils 40 and 42 of the sensing winding 36 by the excitation winding 28, in the unloaded case, will cancel with a null output appearing at the sensing device 38.

FIG. 2B is a schematic diagram of the load cell when placed in a loaded condition due to the application of a load force F at the top edge of the beam member 10 at the vertical ais 20 in a direction perpendicular to the longitudinal axis 12. The beam member 10 being supported as a simple beam by the contact support members 14 and 16 deflects a configuration substantially as shown in FIG. 2B, with the beam member 10 being stressed so that a tensile force is applied to the magnetic material appearing below the longitudinal neutral axis 12 and a compressive force is applied to the magnetic material appearing above the longitudinal neutral axis 12. The effect of the tensile and compressive forces on the magnetic material of the beam member 10 is to alter the permeability thereof in opposite directions.

As previously mentioned the material recommended for use to fabricate the beam member 10 is a soft magnetic material which is doubly oriented so as to have an increased change of permeability with stresses. In materials of this type, the permeability thereof is increased at areas placed under tension and permeability is decreased in areas placed in compression. Therefore, with the bottom half of the beam member 10 being placed under tension, the permeability thereof will increase, while the top half being placed in compression will have its permeability decreased.

Due to the increased permeability on the tension side of the beam member 10, the magnetic flux density produced by the excitation current increases thus causing more flux lines to link the bottom coil 42 of the sensing winding 36 per unit of time. Conversely, less flux lines link the coil 40 in the compression side of the beam member 10 due to the decreased permeability of this portion of the beam member 10. With more flux linking the bottom coil 42 than the top coil 40, an unbalanced condition exists in the sensing winding which produces a net output, which is applied across the sensing device 38 giving an indication of the magnitude of unbalance existing between the top and bottom coils 40 and 42 of the sensing winding 36. Since the magnitude of permeability change is proportional to the magnitude of the load force F, the degree of unbalanced sensed by the sensing winding 36 will be indicative of the magnitude of the load force F. The reading on the sensing device 38 thus gives an indication of the amplitude of the load force being applied to the magnetostrictive load cell.

Figure 4:
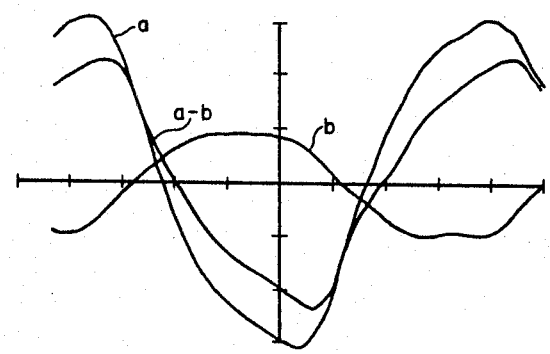

FIG. 4 shows the voltage outputs for the sensing coils 40 and 42 and sensing winding 36 for the loaded condition as shown in FIG. 2B. Curve $a$ indicates the voltage output of the coil 42 in the tension half of the beam member 10; curve $b$ shows the output of the coil 40 in the compression side of the beam member 10; while the resultant output of the sensing winding 36 is shown by curve a–b. It can be seen that the curve a has a large amplitude over that of curve b due to the increased permeability in the tension side of the beam 10 over that of the compression half. Thus, a greater voltage is induced in the coil 42 in the tension half of the beam member 10 over that of the coil 40 in the compression half. The resultant output curve a–b is indicative of the magnitude of load force F applied to the beam member 10, to create the degree of unbalance proportional to the magnitude of this force F.

Figure 5:
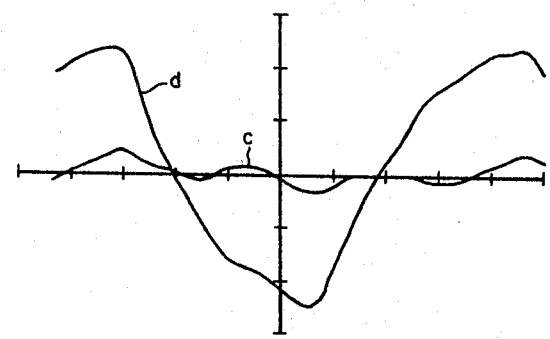

FIG. 5 shows a plot of the voltage output as seen by sensing device 38 in the loaded and unloaded cases as shown respectively in FIGS. 2A and 2B. In FIG. 5, a curve c shows the no-load output provided by the sensing winding 36 whenever the beam member 10 has no force load f applied thereto. The loaded condition is shown in a curve d, which is plotted on the same axis as the no-load curve c. The magnitude of the curve d is proportional to the magnitude of the load force F and will increase and decrease in response to increases and decreases in the magnitude of the load force F. A substantially null output as shown in the curve c, of course, appears when no loading is applied to the beam member 10 and the magnetic material of the beam member 10 has a substantially constant permeability.

The position of the apertures as shown in FIGS. 1, 2A and 2B is, of course, not the only configuration for the apertures. What is essential is that the sensing windings be so placed with respect to the excitation winding that the changes in permeability due to the tensile and compressive forces about the neutral axis 12 can be sensed by the sensing winding 36. FIGS. 6A–6F show other configurations for the various apertures. However, it should be understood that these are not the only configurations that could be utilized, but they are only given herein as exemplary of other aperture configurations. The dot and X convention as shown in FIGS. 6A–6F are similar to those indicated in FIGS. 2A and 2B. Also similar numerical designations for the apertures will be kept in the various figures whenever possible.

Figure 6A:
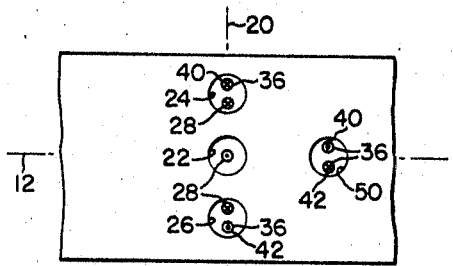
FIGS. 6A through 6F comprise schematic diagrams showing various winding positions for the sensing and excitation windings as utilized herein.

FIG. 6A shows the aperture 22 centrally disposed at the intersection of the axis 12 and 20 and with apertures 24 and 26 being respectively disposed above and below the axis 12 along the axis 20. The excitation winding 28 is shown placed in the apertures 22, 24, and 26 in a similar fashion as to that shown in FIGS. 2A and 2B. A fourth aperture 50 is provided which is disposed along the longitudinal axis 12 a distance away from the aperture 22. The sensing winding 36 appears therein and also in the apertures 24 and 26 in the convention as shown. The sensing coil 40 is defined by the conductors within the apertures 50 and 24 and the sensing coil 42 is defined between the conductors and the apertures 50 and 26. As shown in FIG. 6A these coils 40 and 42 are connected in series bucking relationship so that a null output will be provided therefrom in unloaded condition and an output proportional to the load when a load is applied to the beam member 10.

Figure 6B:
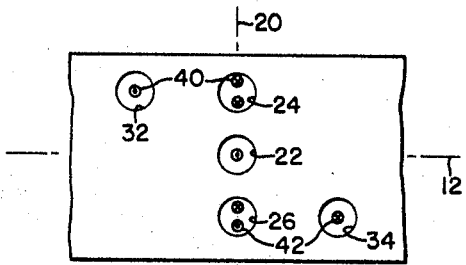

FIG. 6B shows a similar configuration for the apertures 22, 24 and 26 as shown in FIGS. 2A and 2B, with the aperture 34 in the same position as shown in FIG. 2A; however, the aperture 32 appearing in FIG. 2A has been moved to the left side of the vertical axis 20. The coils 40 and 42 are defined as in FIG. 2A, with the coil 40 appearing within the apertures 24 and 32 and the coil 42 appearing within the apertures 26 and 34, with these coils being connected in a series bucking relationship.

Figure 6C:
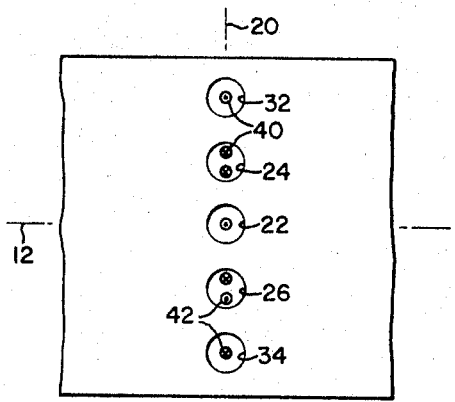

FIG. 6C shows the apertures 22, 24, and 26 appearing along the vertical axis 20 as in previous embodiments; however, the aperture 32 has been moved above the aperture 24 along the vertical axis 20, and the aperture 34 has been moved below the aperture 26 also along the vertical aperture 20. The coil 40 is defined between the conductors found in the apertures 32 and 24 and the coil 42 is defined by the conductors in apertures 26 and 34. These coils are converted in a series bucking relationship as previously defined.

Figure 6D:
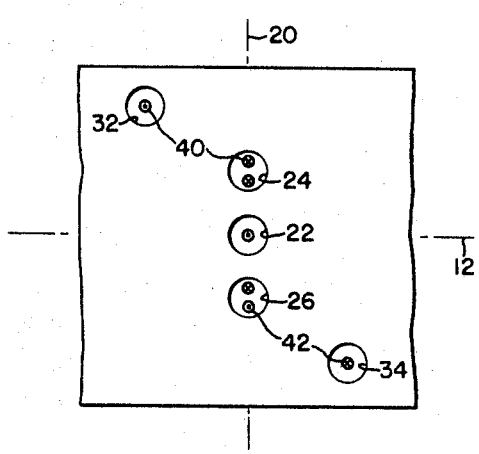

FIG. 6D shows a configuration similar to that of a configuration shown in FIG. 6B. However, in FIG. 6D the apertures 32 and 34 have been removed from being in a horizontal line with the apertures 24 and 26, respectively, and have been moved toward the outside edges of the beam member 10 as shown. The coils 40 and 42 of the sensing winding 36 as defined as in previous embodiments.

Figure 6E:
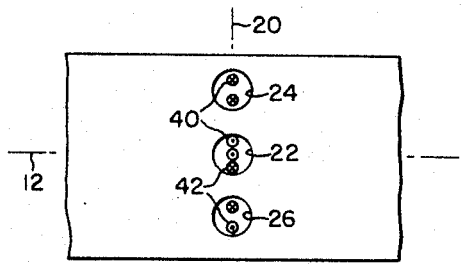

FIG. 6E shows an aperture configuration requiring only the three apertures 22, 24 and 26 disposed along the vertical axis 20. The apertures 22, 24 and 26 carry the excitation winding 28 as previously described in other embodiments. However, the aperture 22 also carries the sensing winding 36, with current applied therethrough passing in opposite directions as indicated by the dot and X convention. The coil 40 of the sensing winding is defined by the conductors appearing in the apertures 22 and 24 and the coil 42 is defined by the conductors of the sensing winding appearing in the apertures 22 and 26. The coils 40 and 42 of the sensing winding 36 are connected in a series bucking relationship so as to sense any unbalance in the magnetic flux linking these coils which will be indicative of a load force applied to the beam member 10 as previously described.

Figure 6F:
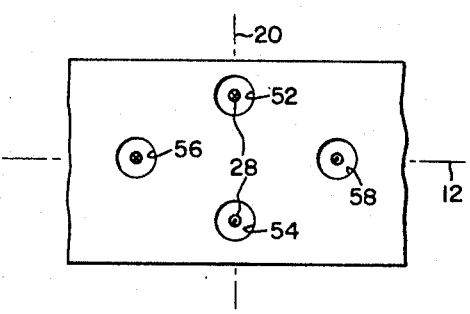

FIG. 6F shows an aperture configuration which is somewhat different from those previously described. In this configuration, a pair of apertures 52 and 54, are disposed on the vertical axis 20 distances symmetrical about the longitudinal axis 12. A pair of apertures 56 and 58 are disposed along the longitudinal axis 12 symmetrical about the vertical axis 20. Within the apertures 52 and 54, the excitation winding 28 is disposed with a dot and X convention as shown. The sensing winding 36 is disposed withing the apertures 56 and 58 according to the convention as shown. The flux lines produced by excitation winding 28, at an instant in time, are shown by the arrows in FIG. 6F. In the unloaded condition a substantially equal magnetic field exists above and below the longitudinal neutral axis 12, and, therefore, the output of the sensing winding 36 will be zero with a substantially zero change of flux thereacross. However, if a load force F is applied to the beam member 10 along the vetrical axis 20, the bottom half of the beam member will be placed in tension while the top half will be placed in compression. The tensile and compressive forces respectively increase and decrease the permeability of the lower and upper halves of the beam member 10. This causes an unbalanced condition to exist so that with flux lines linking the sensing winding 36 so as to induce an output voltage thereacross. This output voltage is sensed by the sensed device 38 with the magnitude of the output voltage being proportional to the magnitude of the load force F applied to the beam member 10.

It can thus be seen that the above described embodiments illustrate a highly advantageous magnetostrictive load sensing device employing a deflectable beam member and wherein a number of different aperture configurations may be utilized. The beam member is placed in compression and tension in opposite halves of a longitudinal neutral axis so as to change the permeability of the magnetic material of the beam member and create an unbalanced condition in the flux linking the sensing winding which produces an output proportional to the magnitude of the load force. A relatively high output is provided in response to a given load through the selection of a magnetic material which has a large charge in permeability with stress, such as, a doubly oriented material. The output magnitude is also enhanced through the use of the beam member which is suspended as a simple beam and provides for stress application of the output in comparison to a block type of magnetic member. The provi-

What is claimed is:
1. A magnetostrictive load cell operative with an exitation source including:
 a beam member having a longitudinal neutral axis and comprising a magnetic material;
 means for supporting said beam member so that by applying a load force to said beam member tensile and compressive forces are created in said member on respective sides of said neutral axis,
 said tensile and compressive forces respectively altering the permeability of said magnetic material, with the permeability changing in magnitude in opposite directions for said tensile and compressive forces respectively from the permeability of said magnetic material when said beam member is unloaded;
 an excitation winding disposed with respect to said beam member and responsive to said excitation source to produce magnetic flux in said beam member; and
 a sensing winding disposed with respect to said beam member and said excitation winding so that said sensing winding provides a first output when said beam member is in an unloaded condition and provides a second output when said load force is applied to said beam member,
 said second output being proportional to the magnitude of said load force and being induced in said sensing winding in response to changes in magnetic flux in said sensing winding due to said tensile and compressive forces respectively altering the magnetic characteristics of said beam member,
 said beam member including a plurality of apertures therein,
 said excitation winding being disposed in selected of said apertures,
 one of the selected apertures having disposed therein said excitation winding is placed on one side of said neutral axis and another is placed on the other side thereof,
 said sensing winding being disposed in selected of said plurality of apertures with respect to said excitation winding and when said load force is applied to said beam member to sense changes in the magnetic flux appearing on respective sides of said longitudinal neutral axis and produce said second output in response thereto,
 the selected apertures having disposed therein said sensing winding are placed along said neutral axis.

References Cited

UNITED STATES PATENTS

| | | | |
|---|---|---|---|
| 3,224,101 | 12/1965 | Ohlsson | 73—88.5 XR |
| 3,292,429 | 12/1966 | Dahle | 73—141 |
| 3,356,977 | 12/1967 | Ohlsson | 336—20 |

CHARLES A. RUEHL, *Primary Examiner.*

U.S. Cl. X.R.

73—88.5; 336—30